Aug. 8, 1933.  H. L. SMITH ET AL  1,921,845
DYNAMO ELECTRIC MACHINE
Filed May 9, 1929   2 Sheets-Sheet 2

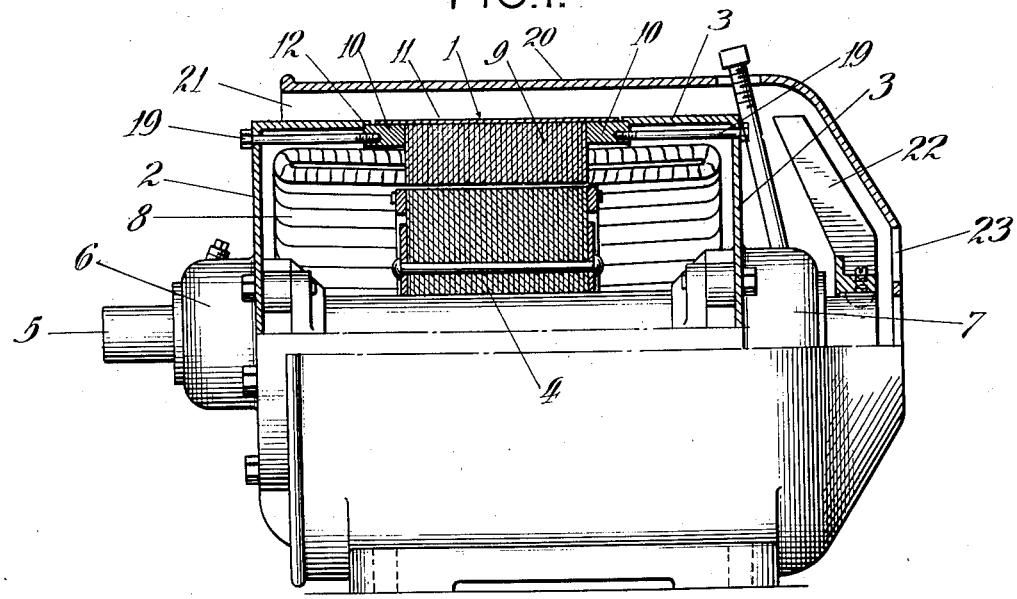
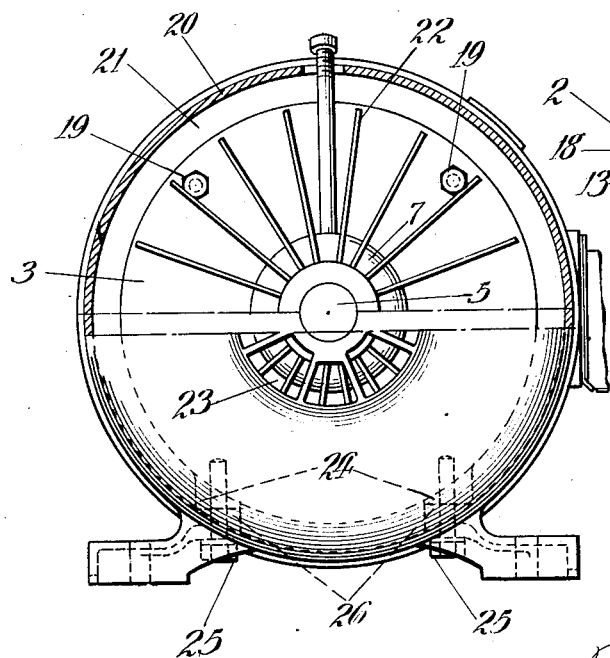
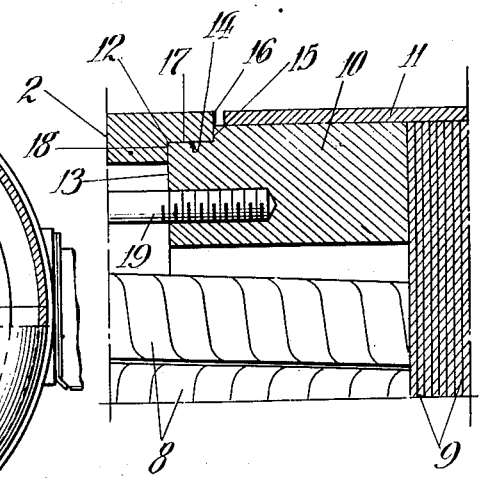

Inventors:
Harold L. Smith,
Frank J. Rathbun and
Alfred M. Forman.
By Edwin B. H. Tower, Jr.
Attorney.

Patented Aug. 8, 1933

1,921,845

UNITED STATES PATENT OFFICE 1,921,845

DYNAMO-ELECTRIC MACHINE

Harold L. Smith, Frank J. Rathbun, and Alfred M. Forman, Milwaukee, Wis., assignors to The Louis Allis Company, Milwaukee, Wis., a Corporation of Wisconsin Application May 9, 1929, Serial No. 361,770, and in Canada April 27, 1928

8 Claims. (Cl. 172—36)

This application is a continuation of application Serial No. 258,298, filed March 1, 1928, as to matter common to both applications.

The invention relates to dynamo-electric machines.

The dynamo-electric machine to which the invention applies in particular is of the type which is provided with a closed casing to exclude ambient diffusible matter from the interior thereof.

The invention has as an object to provide an enclosed dynamo-electric machine in which its efficiency for a given size core is increased under the same operating conditions.

Another object is to provide an enclosed dynamo-electric machine from which heat is rapidly dissipated.

Another object is to provide an enclosed dynamo-electric machine which is efficient, sturdy and compact.

Another object is to provide a dynamo-electric machine which may be readily and economically manufactured.

According to the invention in its general aspect and as ordinarily embodied in practice, the dynamo-electric machine has its stator provided with a laminated core having its laminations imperforate between its winding slots and its outside and bound together between two end rings by a binding joined to the end rings and engaging the outer edges of the laminations, a closed end plate arranged upon each end ring and fastened in a firm position thereon, a rotor arranged within the stator and carried by a shaft having a bearing in each end plate, a ventilating casing arranged around the inner casing, and a fan to cause external air to pass through the ventilating casing in contact with the stator core.

The invention is exemplified by the electric motors illustrated in the accompanying drawings in which the views are as follows:—

Fig. 1 is a side view, partly in central section, of an enclosed ventilated motor.

Fig. 2 is an end view thereof, partly in section.

Fig. 3 is a detail view.

Figure 4:
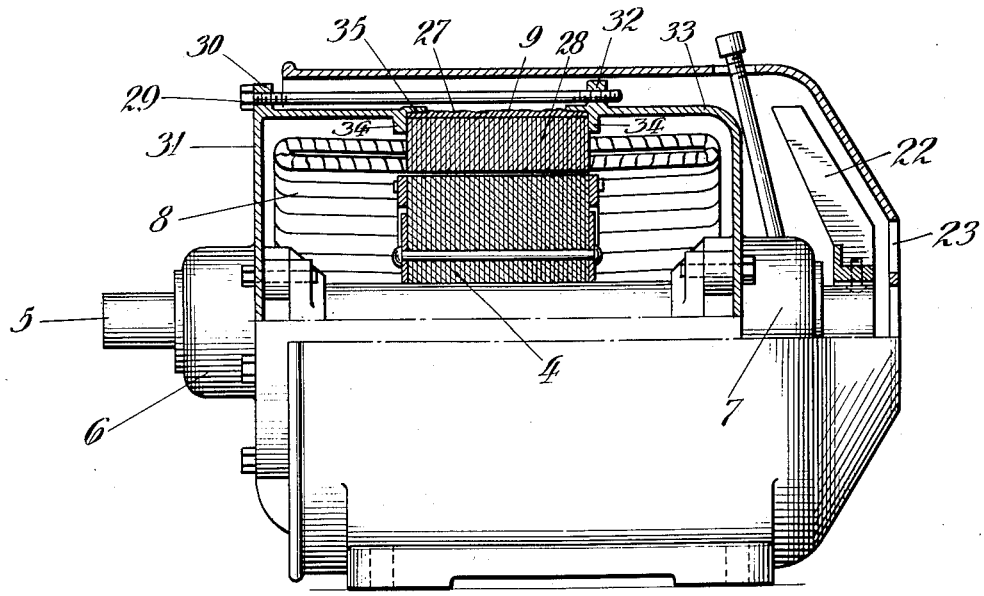
Fig. 4 is a view similar to Fig. 1 showing different means for securing the several parts of the motor case to each other.

Figs. 1 to 3.

The motor has its stator provided with a laminated core 1 having a closed end plate 2 arranged upon one end thereof and a closed end plate 3 arranged upon the other end thereof and forming with the core a closed inner casing to exclude ambient diffusible matter from the interior of the motor.

The core 1 has a rotor core 4 arranged therein upon a shaft 5 which is carried in bearings 6 and 7 arranged, respectively, in the end plates 2 and 3.

The stator core 1 is preferably a complete unit which carries the usual windings 8 and has its laminæ 9 bound together between two end rings 10 by a thin metal shell 11.

The end rings 10 abut the outer laminæ and are welded to the shell 11 which is in intimate contact with the peripheries of the laminæ and may be welded thereto.

The shell 11 may be either a cylinder or consist of strips spaced around the periphery of the core.

The ends of the rings 10 and the ends of the end plates are shaped to provide tight joints 12 therebetween which are preferably angular in cross-section.

Each end ring is shaped to provide upon the outside thereof an annular surface 14 and a shoulder 15.

Each end plate is shaped at its inner end 16 to provide upon the inside thereof an annular surface 17 and a shoulder 18.

The annular surfaces co-act with each other to form a tight joint and to aline the end plates and the stator core.

The end 13 may abut the shoulder 18, the end 16 abut the shoulder 15, or each end abut a shoulder to limit the inward movement of the end plates and form a tight joint.

The end rings have elongated bolts 19 threaded therein to secure the end plates and the stator core together and form a closed casing to exclude ambient diffusible matter from the interior of the machine.

The outside diameter of the stator core may be reduced to the minimum as the laminæ are imperforate between the winding slots and the outside of the core. Consequently, the distance from the inner periphery of the stator core to the outside of the machine is short and heat generated by the machine is rapidly dissipated through the stator core.

As the shell 11 is very thin and in intimate contact with the laminæ, dissipation of heat is not materially impeded thereby.

In order to provide more rapid dissipation of heat, the motor is provided with an outer or ventilating casing 20 which is open at one end and spaced from the closed casing to form a ventilating passage 21 through which air is forced by a fan 22 carried by the shaft 5.

The air is drawn into the casing 20 through an inlet 23 by the fan 22, passed over the periphery of the core 1 to cool the same, and discharged from the open end of the casing.

The closing casing is supported in the outer casing by lugs 24 which are carried by the core 1 and secured by bolts 25 to bosses 26 formed in the outer casing.

Figs. 4 to 6.

Figure 5:
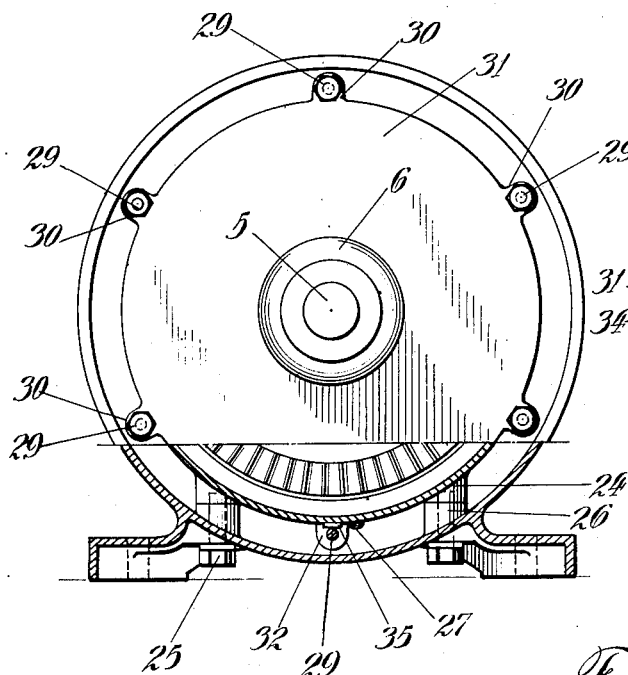
Fig. 5 is an end view, partly in section, of the motor shown in Fig. 3.

The motor shown in Figs. 4 and 5 differs from that shown in Figs. 1 and 2 only in the manner in which the laminæ of the stator core are held together and the manner in which the end plates and stator core are connected.

The laminæ 9 are fastened together by strips of welding 27 spaced around the periphery of the stator core 28.

The end plates and the stator core are held together by bolts 29 which extend through lugs 30 on the end plate 31 and are threaded into lugs 32 on the end plate 33.

The end plates 31 and 33 are provided with annular flanges 34 which are shaped to form tight joints with the stator core 28.

Lugs 35 may be spaced around the inner ends of the end plates 31 and 33 to engage the periphery of the core 28 and aline the end plates therewith when assembling the motor.

Figure 6:
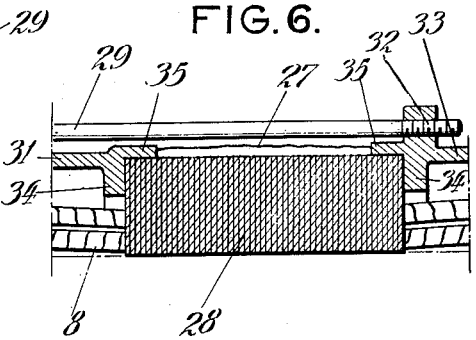
Fig. 6 is a detail view.

The strips of welding 27 may be faced at the ends thereof to provide uniform contact surfaces for the lugs 35, as shown in Fig. 4, or the lugs 35 may engage the periphery of the core intermediate the strips of welding 27, as shown in Figs. 5 and 6.

The invention herein set forth is susceptible of various modifications without departing from the scope thereof as hereafter claimed.

The invention is claimed as follows:

1. An enclosed dynamo-electric machine, comprising a stator provided with a liminated core having its laminæ imperforate between its winding slots and its outside, an end ring arranged upon each end of said core, a binding arranged across said laminæ in engagement with the outside edges thereof and connected to said end rings to secure said laminæ between the same, a closed end plate arranged upon each end ring and forming therewith a closed inner casing, means to secure said end plates in position upon said core, a rotor arranged within said core and having its shaft bearing in said end plates, and a ventilating casing arranged around said core to enclose a ventilating passage for the circulation of external air over said core.

2. An enclosed dynamo-electric machine, comprising a stator provided with a laminated core having its laminæ imperforate between its winding slots and its outside, an end ring arranged upon each end of said core, a thin metal plate arranged across said laminæ in engagement with the outside edges thereof and connected to said end rings to secure said laminæ between the same, a closed end plate arranged upon each end ring and forming therewith a closed inner casing, means to secure said end plates in position upon said core, a rotor arranged within said core and having its shaft bearing in said end plates, and a ventilating casing arranged around said core to enclose a ventilating passage for the circulation of external air over said core.

3. An enclosed dynamo-electric machine, comprising a stator provided with a laminated core having its laminæ imperforate between its winding slots and its outside, an end ring arranged upon each end of said core, a thin cylindrical plate arranged across and around said laminæ in engagement with the outside edges thereof and connected to said end rings to secure said laminæ between the same, a closed end plate arranged upon each end ring and forming therewith a closed inner casing, means to secure said end plates in position upon said core, a rotor arranged within said core and having its shaft bearing in said end plates, and a ventilating casing arranged around said core to enclose a ventilating passage for the circulation of external air over said core.

4. An enclosed dynamo-electric machine, comprising a stator provided with a laminated core having its laminæ imperforate between its winding slots and its outside, an end ring arranged upon each end of said core, a thin metal plate arranged across said laminæ in engagement with the outside edges thereof and connected to said end rings to secure said laminæ between the same, a closed end plate arranged upon each end ring and forming therewith a closed inner casing, means external to the laminæ of said core to secure said end plates in position upon said core, a rotor arranged within said core and having its shaft bearing in said end plates, and a ventilating casing arranged around said core to enclose a ventilating passage for the circulation of external air over said core.

5. An enclosed dynamo-electric machine, comprising a stator provided with a laminated core having its laminæ imperforate between its winding slots and its outside, an end ring arranged upon each end of said core, a thin metal plate arranged across said laminæ in engagement with the outside edges thereof and connected to said end rings to secure said laminæ between the same, a closed end plate arranged upon each end ring and forming therewith a closed inner casing, bolts threaded into said end rings to secure said end plates in position upon said core, a rotor arranged within said core and having its shaft bearing in said end plates, and a ventilating casing arranged around said core to enclose a ventilating passage for the circulation of external air over said core.

6. An enclosed dynamo-electric machine, comprising a stator provided with a laminated core having its laminæ imperforate between its winding slots and its outside, an end ring arranged upon each end of said core, a thin metal plate arranged across said laminæ in engagement with the outside edges thereof and connected to said end rings to secure said laminæ between the same, a closed end plate arranged upon each end ring and forming therewith a closed inner casing, means arranged externally of the laminæ of said core to secure said end plates in position upon said core, a rotor arranged within said core and having its shaft bearing in said end plates, and a unitary ventilating casing arranged around said core to enclose a ventilating passage for the circulation of external air over said core and forming a support for said core.

7. A dynamo-electric machine, comprising a stator provided with a laminated core having an end ring arranged upon each end thereof and a shell arranged around the outer edges of its laminations in engagement therewith and overlapping said end rings and welded to the outer peripheries thereof, a closed end plate arranged upon each of said end rings and forming with said stator a closed inner casing to exclude ambient diffusible matter from the interior of said machine, a rotor arranged within said stator and having its shaft bearing in said end plates, an outer casing arranged around said inner casing and spaced therefrom to provide a passageway therebetween, and a fan to cause air to pass through said passageway in direct contact with said inner casing.

8. A dynamo-electric machine, comprising a stator provided with a laminated core having an end ring arranged upon each end thereof and a shell arranged around the outer edges of its laminations in engagement therewith and overlapping said end rings and welded to the outer peripheries thereof, a closed end plate arranged upon each of said end rings and forming with said stator a closed inner casing to exclude ambient diffusible matter from the interior of said machine, a rotor arranged within said stator and having its shaft bearing in said end plates, an outer casing arranged around said inner casing and spaced therefrom to provide a passageway therebetween, a fan casing formed integral with said outer casing, and a fan arranged within said fan casing to cause air to pass through said passageway in direct contact with said inner casing.

HAROLD L. SMITH.
FRANK J. RATHBUN.
ALFRED M. FORMAN.